United States Patent
Falk et al.

(10) Patent No.: US 8,595,061 B2
(45) Date of Patent: Nov. 26, 2013

(54) SYSTEM AND METHOD FOR GENERATING CUSTOMER SURVEYS AND PROMOTIONAL OFFERS

(75) Inventors: Kevin Bernhard Falk, Vancouver (CA); Ryan Walter Volberg, Anmore (CA)

(73) Assignee: Vivonet Inc., Burnaby, British Columbia (CA)

( * ) Notice: Subject to any disclaimer, the term of this patent is extended or adjusted under 35 U.S.C. 154(b) by 0 days.

(21) Appl. No.: 13/101,278

(22) Filed: May 5, 2011

(65) Prior Publication Data

US 2012/0116878 A1     May 10, 2012

Related U.S. Application Data

(63) Continuation-in-part of application No. 09/792,396, filed on Feb. 23, 2001.

(51) Int. Cl.
*G06Q 30/00* (2012.01)

(52) U.S. Cl.
USPC .................. 705/14.25; 705/14.23; 705/14.36; 705/14.39

(58) Field of Classification Search
USPC ........... 705/7.11, 7.29, 7.35, 14.1–18, 20–30, 705/35, 37, 400
See application file for complete search history.

(56) References Cited

U.S. PATENT DOCUMENTS

| | | | |
|---|---|---|---|
| 7,996,521 B2 * | 8/2011 | Chamberlain et al. | 709/224 |
| 2006/0069749 A1 * | 3/2006 | Herz et al. | 709/219 |
| 2008/0209052 A1 * | 8/2008 | Velan et al. | 709/228 |
| 2009/0254971 A1 * | 10/2009 | Herz et al. | 726/1 |

\* cited by examiner

*Primary Examiner* — Igor Borissov
(74) *Attorney, Agent, or Firm* — Brion Raffoul

(57) ABSTRACT

A method and system for automatically generating targeted promotional offers for specific subscribers to an Internet based service. A database that stores details regarding subscriber purchases is accessed for purchased items data relating to a specific subscriber's purchases. This purchased items data is then analyzed to determine the specific subscriber's buying patterns. From this analysis of what the specific subscriber has previously purchased, a suitable item or service is determined to be offered to the specific subscriber to the Internet based service. The promotional offer may be made in conjunction with the gathering of customer or survey feedback data by way of questionnaires.

13 Claims, 10 Drawing Sheets understand# SYSTEM AND METHOD FOR GENERATING CUSTOMER SURVEYS AND PROMOTIONAL OFFERS

RELATED APPLICATIONS

The present application is a continuation-in-part of U.S. patent application Ser. No. 09/792,396 filed Feb. 23, 2001 which is hereby incorporated by reference.

TECHNICAL FIELD

The present invention relates to a computer method and system for receiving customer feedback and information relating to a purchase, and more particularly, automatically generating a particular questionnaire for each purchase and linking the questionnaire results to transaction data.

BACKGROUND OF THE INVENTION

In any business, keeping customers satisfied is critical. Many techniques have been used to determine the level of customer satisfaction. One technique provides for analyzing sales histories and related product matrices. However, only limited information is typically gathered from sales histories. For example, while analyzing sales history for a particular product or group of products may provide information about which products are beginning to weaken in sales, little if any information is provided about why particular products are slowing in sales. Furthermore, although sales history may provide information about regional buying trends, it usually can not indicate why a particular customer was dissatisfied.

Another problem with using sales history data to track customer satisfaction is that the data is usually several weeks or months old by the time an analyzer compiles sales information and reviews the results. By this time, even if a problem can be identified, it is often too late to make a difference in the product's life cycle.

Another technique to determine customer satisfaction is through direct contact with the customer. This can be done either passively or proactively. In the passive approach, complaints received from customers are indexed and stored for reporting and analysis at a later time. In the proactive approach, customer surveys are issued or data is manually collected and subsequently entered into a Customer Relationship Management system. Then either the Customer Relationship Management system or a user of the system can identify issues and proactively schedules customer contact to resolve a particular identified issue. A disadvantage of this approach is that collecting information from customers, either passively or proactively, is a manual, labor-consuming and relatively expensive process.

Getting customer response through the use of generic surveys also has several disadvantages. First, surveys tend to be impersonal and ask general questions such as "How was your meal?" or "Would you shop here again?" that are not unique to a particular customer's experience. Second, surveys are often unnecessarily cumbersome to complete. For example, a survey may ask for the product name, identifier (ID), serial number, store purchased from, purchase price, purchase date, and a host of other questions unrelated to a particular customer's feedback. While the answers to these questions may be important to determine which product or service the customer is commenting on, a customer looking over this type of survey often determines that too much work must be done that is unrelated to their particular transaction and foregoes answering any of the questions in the survey.

A third problem is that surveys are typically filled out by customers some period of time after their purchases. Also, for proactively sent surveys, the periods of time between the actual purchases and the completion of the surveys are great enough to make it difficult for customers to accurately remember the details of their particular purchases. The fourth and perhaps the most significant disadvantage of surveys in the past is that customers often felt that their responses had little or no effect. For these and other reasons, customers often do not respond to surveys, and when they do, the surveys often contain inaccurate and stale data.

Yet another approach for determining customer satisfaction is through the use of Loyalty Cards that contain a customer ID which is used to track a customer's purchases. While this approach associates customer purchases with particular customers, it does not indicate why a particular customer has changed purchasing behavior.

One option for generating surveys is that of offering promotional items or services as a reward to the survey taker. However, this approach does not always work as the item or service being offered as a reward may not be to the liking of the survey taker. In fact, there is no guarantee that the survey taker may even be inclined to accept the promotional offer. This, thereby, negates the incentive offered by the promotional item or service.

SUMMARY OF INVENTION

In accordance with the present invention, there is provided a method and system for automatically generating targeted promotional offers for specific subscribers to an Internet based service. A database that stores details regarding subscriber purchases is accessed for purchased items data relating to a specific subscriber's purchases. This purchased items data is then analyzed to determine the specific subscriber's buying patterns. From this analysis of what the specific subscriber has previously purchased, a suitable item or service is determined to be offered to the specific subscriber to the Internet based service. The promotional offer may be made in conjunction with the gathering of customer or survey feedback data by way of questionnaires.

The invention may be implemented as a computer process, a computing system or as an article of manufacture such as a computer program product or computer readable media. The computer program product may be instructions for executing a computer process encoded on a computer storage media readable by a computer system. The computer program product may also be instructions for executing a computer process encoded on a propagated signal on a carrier readable by a computing system.

In a first aspect, the present invention provides a method for generating specific and targeted offers for a specific subscriber to an Internet-based service, the method comprising:

a) receiving data from multiple different retail establishments, said data regarding multiple retail transactions involving said specific subscriber, said data including a listing of items or services purchased by said specific subscriber;

b) storing said data in a database;

c) retrieving purchased items data from said database, said purchased items data being data relating to items or services previously purchased by said specific subscriber from said multiple different retail establishments;

d) determining at least one buying pattern of said specific subscriber based on said purchased items data;

e) based on at least one of said at least one buying pattern, determining at least one item or service to be offered to said specific subscriber;

f) determining at least one retail establishment which offers said at least one item or service;

g) communicating with said specific subscriber to offer said at least one item or service from said at least one retail establishment.

Another aspect of the invention provides a method for generating specific and targeted offers for a specific user, the method comprising:

a) receiving data from multiple different retail establishments, said data regarding multiple retail transactions involving said specific user, said data including a listing of items or services purchased by said specific user;

b) storing said data in a database;

c) retrieving purchased items data from said database, said purchased items data being data relating to items or services previously purchased by said specific user from said multiple different retail establishments;

d) determining at least one buying pattern of said specific user based on said purchased items data;

e) based on at least one of said at least one buying pattern, determining at least one item or service to be offered to said specific user;

f) communicating with said specific user to offer said at least one item or service.

A further aspect of the invention provides computer-readable media having encoded thereon computer-readable instructions which, when executed, implements a method for generating specific and targeted offers for a specific user, the method comprising:

a) receiving data from multiple different retail establishments, said data regarding multiple retail transactions involving said specific user, said data including a listing of items or services purchased by said specific user;

b) storing said data in a database;

c) retrieving purchased items data from said database, said purchased items data being data relating to items or services previously purchased by said specific user from said multiple different retail establishments;

d) determining at least one buying pattern of said specific user based on said purchased items data;

e) based on at least one of said at least one buying pattern, determining at least one item or service to be offered to said specific user;

f) communicating with said specific user to offer said at least one item or service.

These and various other features as well as advantages, which characterize the present invention, will be apparent from a reading of the following detailed description and a review of the associated drawings.

BRIEF DESCRIPTION OF THE DRAWINGS

The drawings show features and advantages will become more apparent from a detailed consideration of the invention when taken in conjunction with the drawings in which.

DETAILED DESCRIPTION OF THE INVENTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Figure 1:
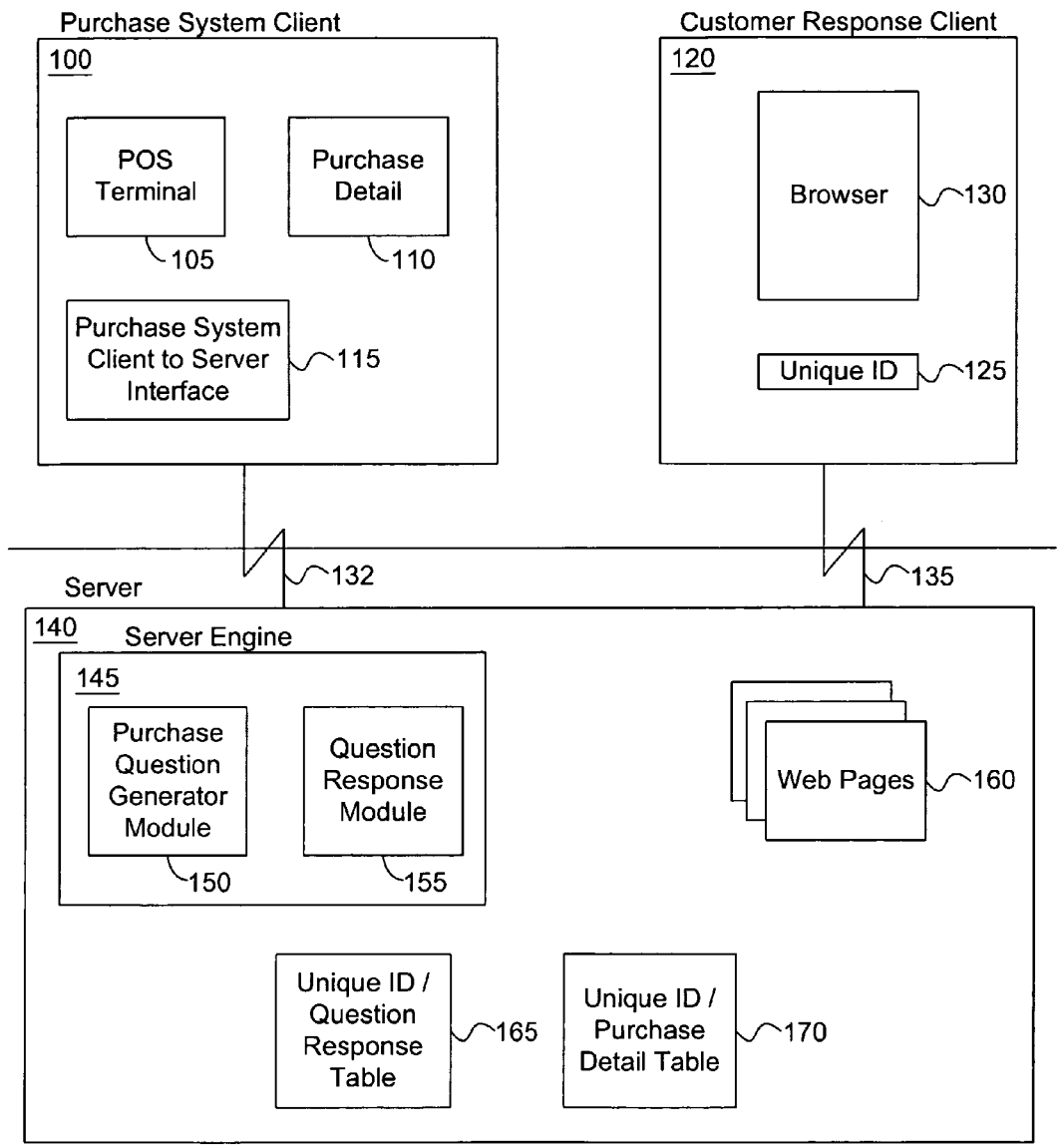
FIG. 1 shows a block diagram for a system for receiving customer feedback in a client/server configuration.

FIG. 1 shows a block diagram for a system for receiving customer feedback in a client/server configuration. Purchase system client 100 includes point of sales (POS) terminal 105, purchase detail component 110, and purchase system client to server interface 115. POS terminal 105 represents anywhere a purchase takes place and includes on-line purchasing, restaurants, grocery stores, department stores, and other places where goods or services are purchased. Purchase detail component 110 collects transaction information that may include price, quantity, and name of each item purchased, time and date of purchase, employees on duty, and/or any other relevant information associated with a purchase. For example, when a customer uses a loyalty card or some other means of identification during the purchase, purchase detail component 110 may collect an ID that identifies the particular customer.

Purchase system client to server interface 115 provides an interface between purchase system client 100 and server 140. Purchase system client 100 communicates with server 140 through communication link 132.

Server 140 includes server engine 145, web pages 160, response table 165, and purchase detail table 170. Server engine 145 includes purchase question generator module 150 and question response module 155. Server 140 includes communications link 132 to purchase system client 100 and communication link 135 to customer response client 120. Purchase question generator module 150 generates questions based on purchase information stored in purchase detail table 170 and preference data associated with seller preferences. Question response module 155 receives customer responses from customer response client 120. Web pages 160 enable customer response client 120 to include a web browser that provides a common interface for collecting customer responses (feedback). Response table 165 stores customer responses and an ID for referencing purchase detail table 170. Purchase detail table 170 stores purchase detail collected on purchase system client 100 and associates an ID and possibly a customer ID with each entry.

In some circumstances, not all purchase detail collected may be stored in purchase detail table 170. For example, a seller may pre-determine that the server should not ask any questions related to certain items. Rather than consume disk space storing purchase detail related to the items, the server may omit storing the items altogether. Alternatively, a purchase detail line may be deleted from purchase detail table 170 when it is determined that it is no longer needed. For example, certain purchase detail transaction lines may trigger purchase generator module 150 to generate a question, while other transaction lines may not cause a question to be generated. In one embodiment, during these scenarios, the transaction lines not triggering a question are deleted to conserve storage space and/or decrease access time to the other remaining transaction lines.

Customer response client 120 is comprised of browser 130 and unique ID 125. It is appreciated that browser 130 may be a web browser, application program, or any device capable of reading web pages. Unique ID 125 is typically the same ID given to the customer at the time of the sale and associated with the customer's purchase in purchase detail table 170. Before submitting responses, a customer enters this ID to identify the particular purchase for which the responses will be given.

While entering the unique ID to identify the purchase, the customer may also enter an ID and password to identify the customer. This enables tracking of responses made by a particular customer. Alternative methods of identifying the customer, such as the use of unique IDs that are stored on smartphones or similar devices, may also be used. The purchasing behavior of the particular customer can be analyzed to provide a unique promotional experience. For example, a seller could promote customer feedback by giving points or coupons to repeat customers who provide feedback regarding their purchasing experience. Another option may be for sellers to provide promotional offers to repeat registered customers who not only continue to provide feedback but who also continue to patronize the seller's retail establishment. This option is more fully explained and described below.

Purchase system client 100, server 140, and customer response client 120 may reside on the same electronic device or may not reside on separate electronic devices.

Computing devices, such as the ones shown in FIG. 1, typically include at least some form of computer-readable media. Computer readable media can be any available media that can be accessed by the computing device. By way of example, computer-readable media might comprise computer storage media and communication media.

Computer storage media includes volatile and nonvolatile, removable and non-removable media implemented in any method or technology for storage of information such as computer readable instructions, data structure, program modules or other data. Computer storage media includes RAM, ROM, EPROM, flash memory or other memory technology, CD-ROM, digital versatile disk (DVD) or other optical storage, magnetic cassettes, magnetic tape, magnetic disk storage or other magnetic storage devices, or any other medium that can be used to store the desired information and that can be accessed by a computing device.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 2:
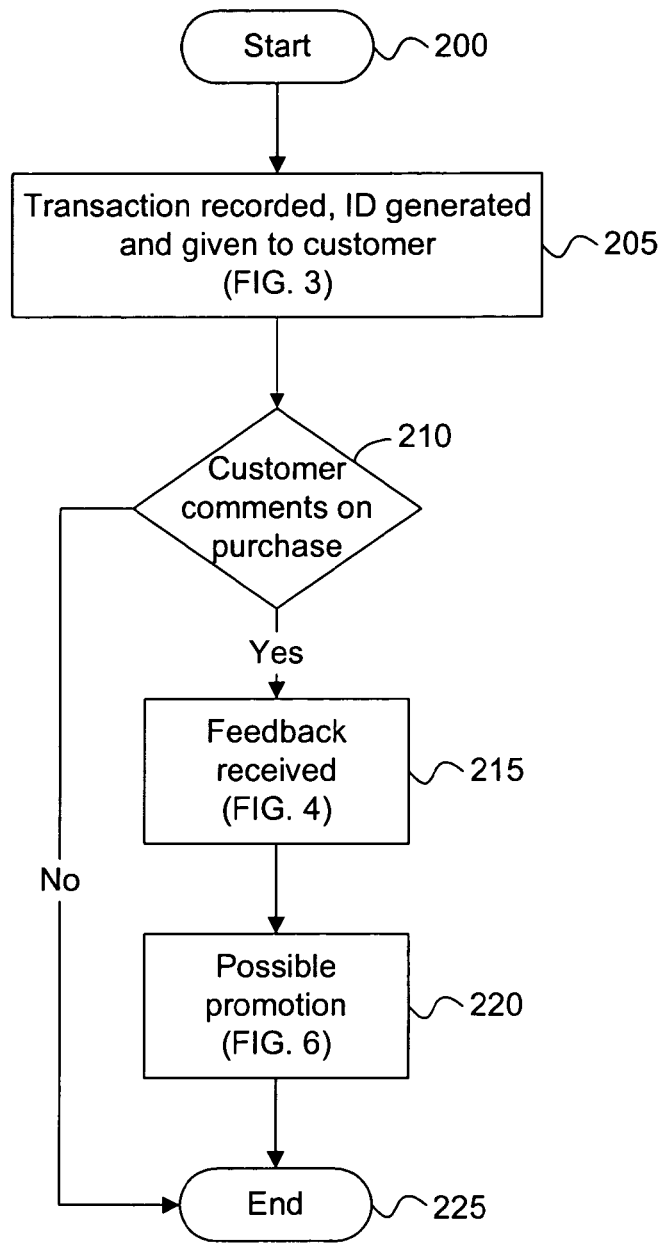
FIG. 2 illustrates a flow chart for generating questions and receiving feedback related to a purchase.

FIG. 2 illustrates a flow chart for generating questions and receiving feedback related to a purchase. The process starts at block 200 when a purchase is made.

Figure 3:
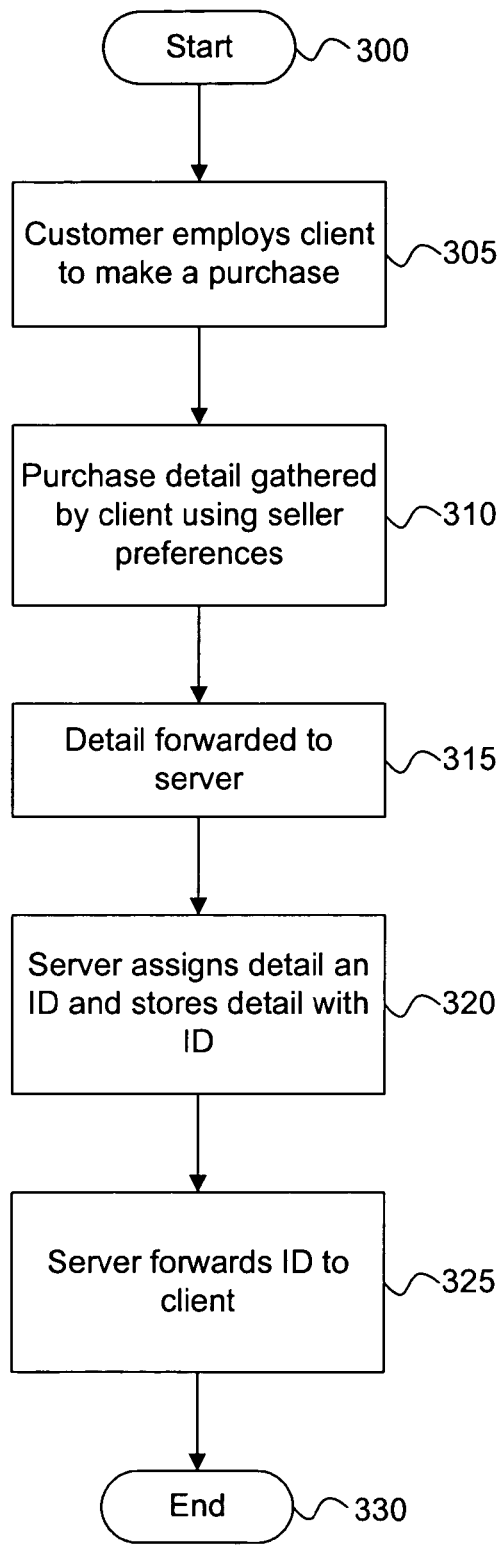
FIG. 3 illustrates a flow chart for gathering information relating to a purchase and associating an ID with the purchase.

At block 205, a purchase occurs as described in detail in conjunction with FIG. 3. Briefly stated, a customer makes a purchase, details regarding the purchase are stored, and an ID identifying the purchase transaction is given to the customer. For example, referring to FIG. 1, a customer makes a purchase at POS terminal 105. Purchase detail is sent to server 140, and an ID is generated and sent back to POS terminal 105 and given to the customer.

At block 210, a determination is made as to whether feedback will be provided. When feedback is to be provided, the yes branch is followed and processing continues at block 215. Otherwise, the no branch is followed and processing continues at block 225. It will be appreciated that feedback may be provided immediately after the transaction or any time thereafter.

Figure 4:
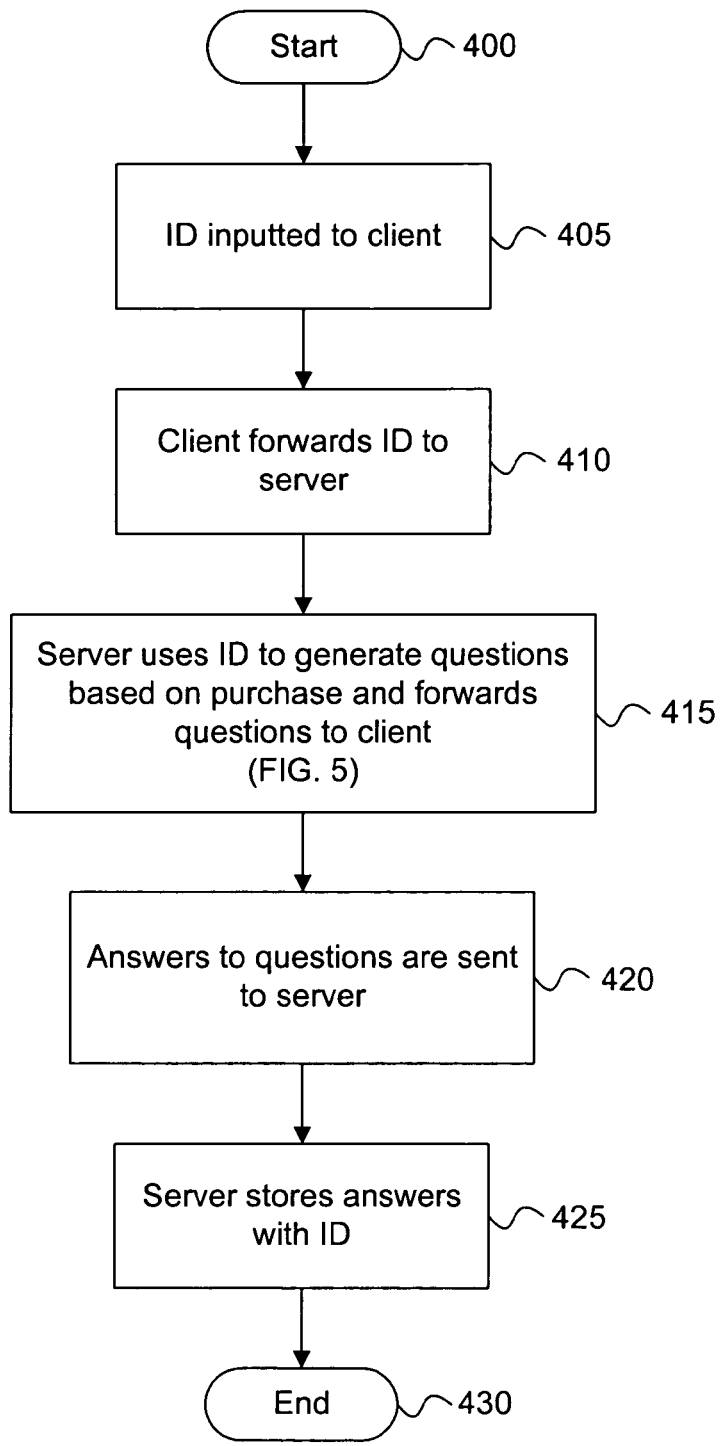
FIG. 4 shows a flow chart for automatically gathering feedback associated with a purchase.

At block 215, feedback about a purchase is received as described in conjunction with FIG. 4. Briefly stated, an ID associated with a purchase is entered into a client computer which forwards the ID to a server. The server generates at least one question or questions related to the purchase and forwards the questions to the client computer. The client computer receives the questions, solicits responses to the questions, and returns the responses to the server which then stores them. For example, referring to FIG. 1, a customer uses browser 130 to connect to server 140 and to provide feedback regarding a purchase associated with unique ID 125.

In another embodiment, a server may pre-generate questions after the purchase details are forwarded to the server. Pre-generating questions may be done to move the generation of questions to off-peak compute times, to speed response when the customer provides feedback, or for other reasons. The generated questions may then be stored together with the ID that is returned to the customer. When a user desires to provide feedback, the pre-generated questions may then be retrieved by the server and sent to the computer receiving feedback regarding the purchase.

At block 220, a promotion may be generated. For example, a seller may promote customer feedback by giving points or coupons to repeat customers who provide feedback regarding their purchasing experience. For example, referring to FIG. 1, server 140 generates a promotion and forwards it to customer response client 120. Another example of a promotion would be one in which the user who provided the feedback would have his or her prior purchases analyzed and a suitable promotional offer for that specific user would be generated based on that user's purchasing patterns. This example is explained and described further below.

At block 225, processing ends. At this point, details related to the purchase have been recorded. When feedback is received, this is also recorded and associated with the purchase. Both the purchase detail and the feedback may be immediately retrieved for analysis and reporting. A user may be rewarded when the server determines that a promotion is appropriate.

FIG. 3 illustrates a flow chart for gathering information relating to a purchase and associating an ID with the purchase. The process starts at block 300 when the purchase is made.

At block 305, a customer employs client hardware and/or software (hereinafter referred to as the client system) to make a purchase. Client hardware includes cash registers, POS (point of sale) terminals, personal computers, hand-held devices, multiprocessor systems, microprocessor-based or programmable consumer electronics, network PCs, minicomputers, mainframe computers, smartphones, tablet computing devices, and the like. Client software typically executes on client hardware and works in conjunction with the hardware to enable the customer to make the purchase and to perform various other functions described in conjunction with FIG. 3. For example, referring to FIG. 1, a customer employs purchase system client 100 to make a purchase.

At block 310, purchase detail is collected by the client system. For example, referring to FIG. 1, purchase detail component 110 may collect price, quantity, and name of each item purchased, time of purchase, employees working during purchase, and an ID identifying the customer. An advantage of collecting this information is that the customer does not have to re-enter the purchase information when providing feedback about the purchase. Another advantage is that information the customer may be unaware of and should not need to be concerned with may also be collected such as manager on duty, cashier, waiter, chef, etc.

Yet another advantage is that the purchase detail can be used to generate customized questionnaires automatically. For example, instead of asking "How was your food?" or "Will you come back?" the purchase detail can be used to ask "How was your deluxe cheese hamburger?" or "How was your service from the cashier, Mike?" Such transaction-related questions may aid the customer in providing more accurate and relevant answers. Furthermore, because a customer is not required to fill in details regarding the purchase such as what they ate, what grocery item they purchased, the time and date of the transaction, etc., the customer may determine that the questionnaire will not require too much time to complete and may be more willing to complete it.

At block 315, the purchase detail is forwarded from the client system to a server. For example, referring to FIG. 1, purchase system client to server interface 115 sends the purchase detail to server 140.

At block 320, the server receives the purchase detail, assigns an ID to the detail, and stores the purchase detail with the ID for future access. This allows the server to retrieve the purchase detail when a client system identifies the purchase by giving the ID. Typically, the ID assigned will be unique with respect to other IDs stored. Over time, however, IDs may be reused. For example, after a purchase detail associated with an ID is no longer needed, it may be deleted or archived. When the purchase detail is deleted or archived, the ID may be available for use in identifying another purchase detail. For example, referring to FIG. 1, server 140 receives purchase detail from purchase system client to server interface 115. Then, server 140 generates an ID and stores the purchase detail with the ID in detail table 170.

At block 325, the server sends the ID to the client system. This allows the client system to give the ID to a customer for use when the customer provides feedback. For example, referring to FIG. 1, server 140 sends purchase system client 100 the ID.

At block 330, processing ends. At this point, the client system has collected purchase detail and forwarded it to the server. The server has generated an ID and stored the purchase detail with it for future use. Additionally, the server has sent the ID to the client system so that it may give the ID to the customer.

It will be appreciated that the client system may give the ID to the customer in many ways, including displaying it for the customer to read, storing it in a file on a computer, such as in a cookie, printing it on a bar code on a receipt given to the customer, encoding it on a loyalty card presented by the customer, encoding it on a ticket given to the customer, transmitting it to the customer through electronic mail, transmitting it to a wireless personal communication device (e.g. a cellular handset or a smartphone), and the like.

In one embodiment of the invention, purchase detail is forwarded to the server at the time of the purchase. In another embodiment of the invention, purchase detail is forwarded in batches. When purchase detail is forwarded in batches, the ID may be generated differently. When a customer is ready to complete a purchase transaction, typically, the customer desires to be finished as soon as possible. For example, when checking out of a grocery store a customer typically wants to pay for the items purchased and take the groceries to the car. When leaving a restaurant, a customer typically wants to pay the waiter or cashier and leave. When purchase details are sent as a batch, depending on the batch size and the number of customers, it may take several minutes or hours before a batch is sent. A customer would not likely wish to wait the minutes or hours for the batch to be sent and an ID to be returned to the customer for use during feedback.

The wait for an ID in a batched system may be avoided by having the client system generate an ID immediately which it displays to the customer. Upon sending of the batched information, the client system would also send the ID so that the server system could store the ID given to the customer with the purchase made by the customer. In this embodiment of the invention, the server does not need to generate the ID or send it back to the client because the client generated it. Many clients systems, however, may be active simultaneously. Without proper integration, the client systems may assign the same ID to two different purchases. In light of this disclosure, it will be recognized that in a batched system a method or system for avoiding or dealing with duplicate IDs may be required. One system, for example, for avoiding duplicate IDs is to assign each client a unique client ID and to have the client embed its unique client ID in IDs the client generates, thus creating IDs that uniquely identify purchases when multiple clients are employed in a batched system.

FIG. 4 shows a flow chart for automatically gathering feedback associated with a purchase. The process starts at block 400 when a user is ready to provide feedback regarding a purchase transaction.

At block 405, an ID is inputted into a customer response client. Inputting the ID into the customer response client may be done in many ways, including entering the ID on a keyboard, using a computer on which the ID was stored as a cookie or otherwise, scanning a bar code, swiping a loyalty card containing the ID, etc. For example, referring to FIG. 1, a customer uses customer response client 120 to input unique ID 125 into browser 130.

At block 410, the customer response client forwards the ID to the server. For example, referring to FIG. 1, customer response client 120 forwards unique ID 125 to server 140.

Figure 5:
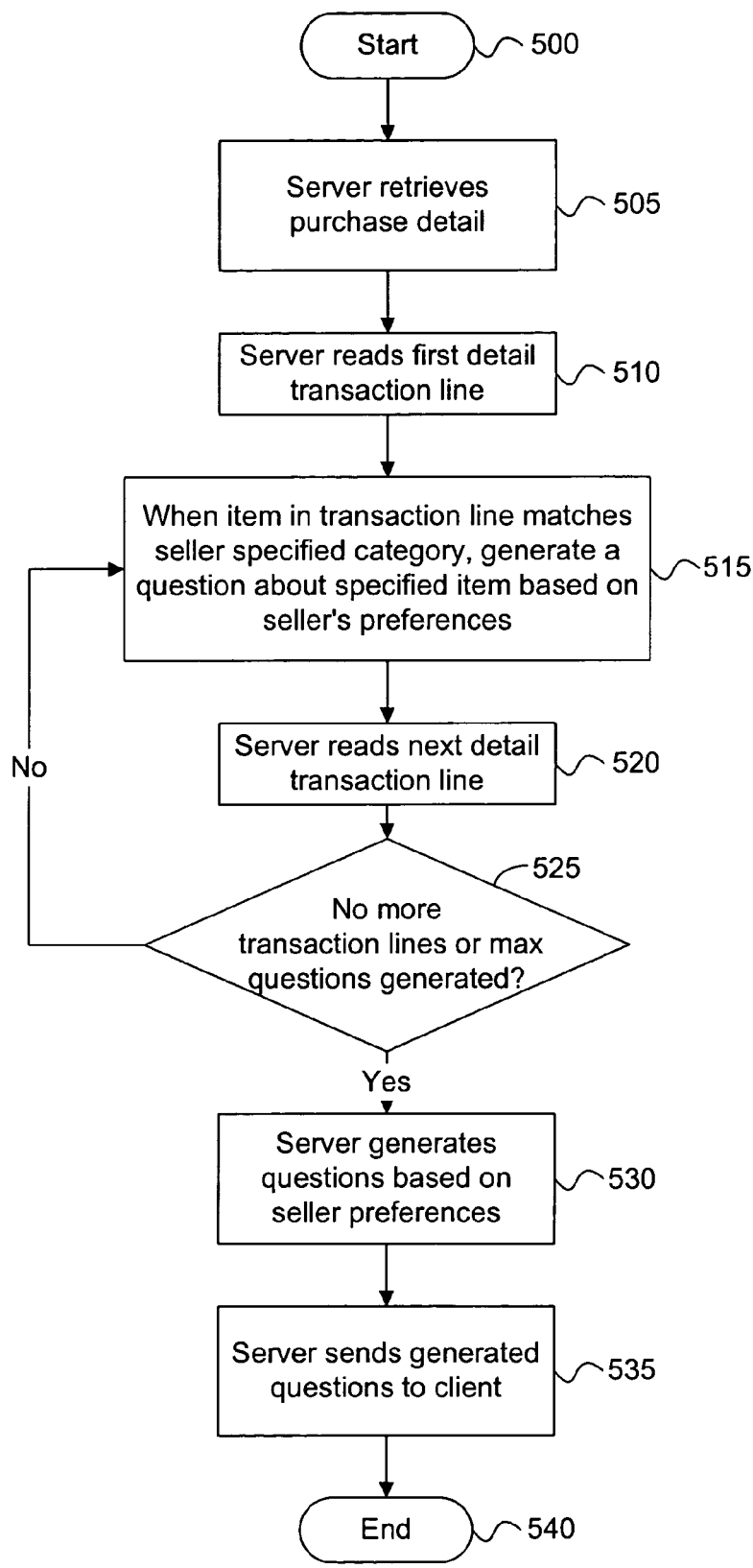
FIG. 5 illustrates a flow chart for automatically generating questions for a purchase.

At block 415, the server retrieves purchase detail associated with the ID and generates questions for the purchase as described in detail in conjunction with FIG. 5. Briefly, the questions generated are related to the items purchased and preference data associated with seller preferences. For example, referring to FIG. 1, server 140 uses the ID to retrieve related purchase information in purchase detail table 170. Then, purchase question generator module 150 generates questions based on the detail retrieved. Typically, these questions are then formatted into web pages 160 which are then sent to browser 130. Of course, the survey may be sent to the customer using a different method other than by way of a browser. For such implementations, the questions may be formatted differently. As an example, if the questions are to be disseminated using text messages or by way of applications on smartphones, the formatting would be different than for question disseminations based on web browsers.

At block 420, the questions are displayed to the customer and answers are collected. Then, the answers are sent to the server. When a customer does not answer one or more questions, the response(s) of not answering for the one or more questions may also be sent to the server. For example, referring to FIG. 1, browser 130 reads the questions on web pages 160 and displays them to the customer. The customer answers the questions by using browser 130 and indicates that the answers are completed. Then, browser 130 sends the answers to server 140 for use in a question response module 155. The answers may be sent one-at-a-time in real time to the server, or, alternatively, answers may be grouped together and sent to the server in batches.

At block 425, the server stores the answers together with the ID for future analysis. When the server stores the answers, they are immediately available for analysis. For example, referring to FIG. 1, server 140 stores the answers with the ID in question response table 165.

At block 430, processing completes. At this point, questions related to a purchase have been generated, and feedback has been received and stored for analysis and reporting.

FIG. 5 illustrates a flow chart for automatically generating questions for a purchase. The process starts at block 500 when a user is ready to provide feedback regarding a purchase transaction.

At block 505, the server locates purchase detail associated with the purchase that was previously stored on the server. The server typically retrieves the purchase detail by using an ID supplied by the user. Usually, the ID is associated with the purchase detail previously stored on the server. For example, referring to FIG. 1, server 140 locates purchase detail associated with the ID from purchase detail table 170.

At block 510, the server retrieves a first transaction line from the purchase detail the server previously located. A purchase may include many items and each item may be associated with a different transaction line. For example, a grocery store receipt may have fruit, vegetables, and shoe polish each on separate transaction lines. Referring to FIG. 1, for example, server 140 reads a first transaction line from the purchase detail.

At block 515, the transaction line is searched for seller specified items. When an item in the transaction line matches a seller's specified category, a question about the item may be generated depending on preference data associated with seller preferences. The seller may prefer to generate one type of question when fruit is purchased and another type of question when shoe polish is purchased. For example, referring to FIG. 1, purchase question generator module 150 determines if an item in the retrieved transaction line matches a seller specified category. When an item in the retrieved transaction line matches a seller specified category, the purchase question generator module 150 may generate a question.

At block 520, the server retrieves the next detail transaction line (if it exists) from the purchase detail. For example, referring to FIG. 1, server 140 reads the next transaction line from the purchase detail.

At block 525, a determination is made as to whether either no more transaction lines exist for the purchase or whether a maximum number of questions have been generated regarding the purchase. When either of these conditions exists, the yes branch is followed to block 530. Otherwise, the no branch is followed to block 515. For example, referring to FIG. 1, server 140 determines when additional transaction lines exist for a purchase and purchase question generator module 150 determines when the maximum number of questions has been generated.

At block 530, the server generates additional questions based on preference data associated with seller preferences. The seller may prefer, for example, that a question be asked regarding the quality of service rendered to the customer in addition to other questions related to specific transaction lines. For example, referring to FIG. 1, purchase question generator module applies preference data associated with seller preferences to add additional questions to be asked to the customer.

At block 535, the server sends the generated questions to the client computer. The server may do so by generating web pages that the client computer accesses. For example, referring to FIG. 1, purchase question generator module 150 completes the list of questions to be asked and creates web pages 160 to be read by customer response client 120.

At block 540, processing ends. At this point, questions have been generated based on the items purchased and preference data associated with seller preferences. These questions have been made available to the customer, typically in the form of web pages.

It will be appreciated that seller preferences may cause question generation to depend on previous questions generated and responses received. For example, a seller may prefer that a particular question no longer be generated when no or few customers queried respond to it. In addition, a seller may prefer that a question that has been answered numerous times no longer be generated as a large enough sample has been generated for analysis. The seller may specify that after the question has been answered a certain number of times that another question be asked instead of the question.

Figure 6:
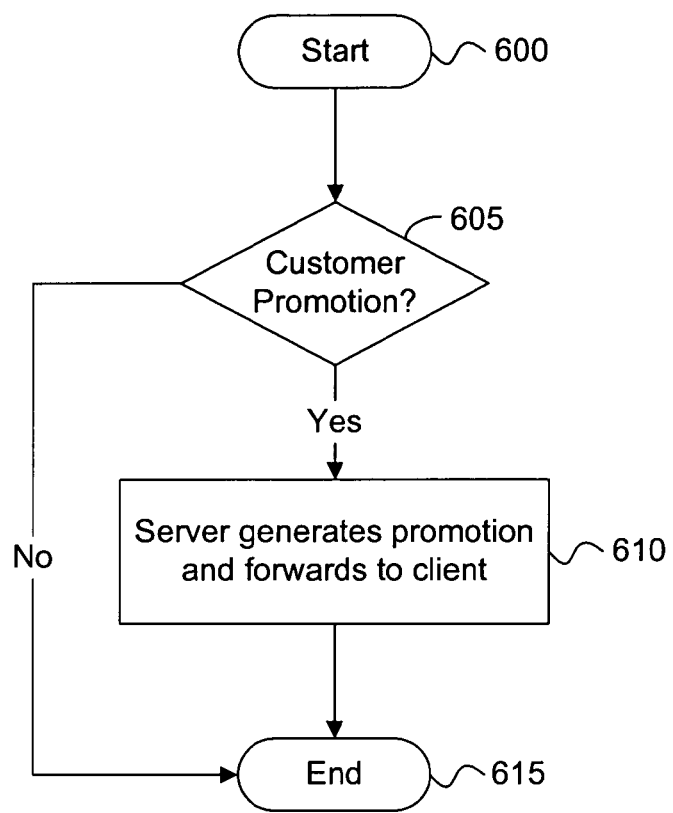
FIG. 6 illustrates a flow chart for automatically generating promotions to reward customer feedback.

FIG. 6 illustrates a flow chart for automatically generating promotions to reward customer feedback. The process starts at block 600 when a user has provided feedback regarding a purchase transaction.

At block 605, a determination is made as to whether a promotion should be generated. The determination may depend on many factors including how many questionnaires a customer has completed, advertising needs for a particular product, the feedback the customer provides, items in the purchase transaction, random generations calculated to promote customer feedback, and/or any other factor(s) a seller prefers. For example, a positive determination to generate a promotion may occur when a customer provides feedback for a television (or other electronic device) for selected questions of a questionnaire. The system may determine, for example, that the customer should be given a coupon giving a discount on a selected DVD. When it is determined that a promotion should be generated, the yes branch is followed to block 610. Otherwise, the no block is followed to block 615.

Figure 9:
FIG. 9 shows exemplary incentive that may be provided for answering a questionnaire regarding a purchase in accordance with the invention.

At block 610, the server generates a promotion and forwards it to a client computer to give to the customer. The client computer may prompt the customer to save the promotion for future use, to purchase the promotion immediately, or to print a coupon. When the customer elects to save or purchase the promotion, it may be saved on the server and an ID identifying the customer may be required. For example, referring to FIG. 1, server 140 generates a promotion and forwards it to customer response client 120. An illustrative example of a promotion given to a customer is shown in FIG. 9 and described in conjunction therewith.

At block 615, processing ends. At this point a promotion, when generated, has been forwarded to a client computer and given to the customer. A customer wishing to immediately purchase the promotion will then be directed to a payment application. Once payment has been made, a coupon evidencing the purchased promotion can then be sent to the customer.

While the above process for generating a promotion may be used, a more targeted approach is also possible. Instead of only generating generic promotional offers, the system may determine customized promotional offers that are designed to appeal to a specific customer's tastes. This customized process is discussed and described in greater detail below.

Figure 7:
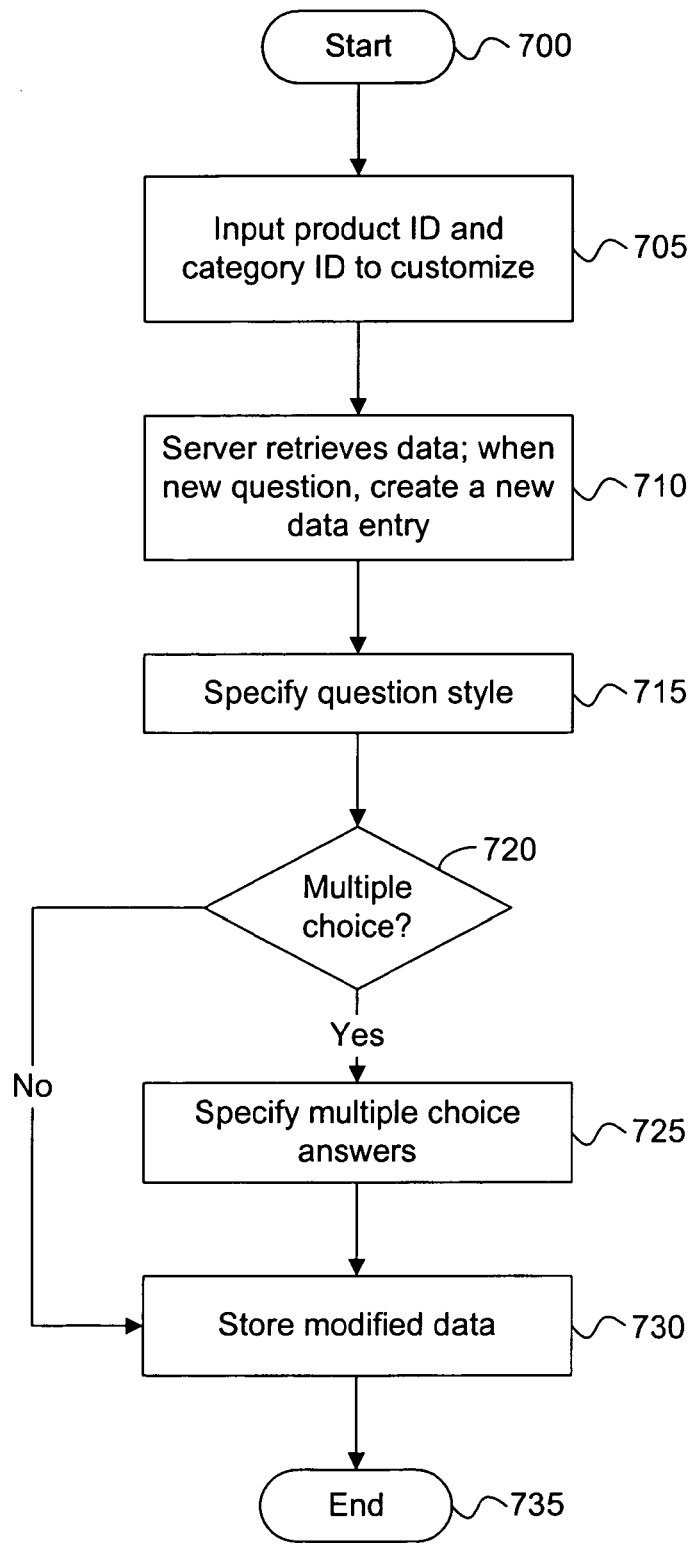
FIG. 7 shows a flow chart for specifying seller preferences for reporting and/or for questions automatically generated for purchases.

FIG. 7 shows a flow chart for specifying seller preferences for reporting and/or for questions automatically generated for purchases. The process starts at block 700 when a user desires to set preferences.

At block 705, the user inputs a product ID and a category ID. The product ID and category ID identify the product or products for which preferences will be set. For example, the user may enter a product ID identifying a shirt and a category ID identifying clothing. Referring to FIG. 1, for example, a user uses a client computer (not shown) to connect to server 140 and enters a product ID and a category ID.

At block 710, the server retrieves preference data related to the product ID and the category ID. When the user is adding a new question, a new data entry is added in a preference table. When the user is modifying an existing question, the existing data entry is located. For example, referring to FIG. 1, server 140 retrieves or adds an entry to a seller preferences table (not shown).

At block 715, the user specifies a question style. Question styles include multiple choice, yes/no, fill in the blank, rating scales, free form text responses, and the like. Question styles include questions that could be asked in a paper survey. For example, referring to FIG. 1, server 140 receives a selection as to which question style is desired.

At block 720, a determination is made as to whether the question style selected is multiple choice. When it is, the yes branch is followed to block 725. Otherwise, the no branch is followed to block 730. For example, referring to FIG. 1, server 140 determines whether a multiple choice question style has been selected.

At block 725, choices for a multiple choice question are selected. These choices are stored for use when the server is generating multiple choice questions regarding a purchase. For example, referring to FIG. 1, server 140 prompts the user for choices allowed in a multiple choice question.

At block 730, the question style and information about the question are stored so that the server can access the information when it is generating questions regarding a purchase. Information about the question includes such things as product ID, category ID, text used for the question, where to insert an item description or name, and other information relevant to generating the question. For example, referring to FIG. 1, server 140 stores information about the question and the question style in a seller preferences database (not shown) for use when purchase question generator module 145 generates questions.

At block 735, processing ends. At this point a question style and information about a question have been stored on the server for use during automatic question generation. A user setting seller preferences may add or change questions by repeating the process above.

Figure 8:
FIG. 8 shows an exemplary questionnaire that includes a list of feedback questions that could be asked of a customer.

FIG. 8 shows an exemplary questionnaire that includes a list of feedback questions that could be asked of a customer. Questions 810 illustrate customer feedback questions with the names of exemplary items purchased shown in italics along with multiple choice responses. It will be appreciated that the third and fourth feedback questions, "How was your service?" and "Will you return?" may be generated based on the preference of a seller and may not be related to the actual items purchased.

The questions shown in FIG. 8 represent only a sample of questions that may be asked of a customer. Other question styles include fill in the blank, quality of service ratings, free form text responses, and the like.

FIG. 9 shows an exemplary incentive that may be provided for answering a questionnaire regarding a purchase. Incentive 915 includes an offer for a 20% discount at the customer's next meal at Earl's. It will be appreciated that several different incentive programs could be used to encourage a customer to provide responses to a survey.

It should be noted that, as noted above, the system may generate more customized promotional offers. The system may do this for specific customers or for specific users by gathering the purchasing history of these customers and users and analyzing this history. The customer's and/or user's purchasing preferences or patterns can then be extracted. These preferences and patterns can then be used to determine what promotional offer would be suitable for the specific customer or user.

It should also be noted that this generation of customized promotional offers may be used in conjunction with a service to which subscribers may sign up for. As an example, the operators of the server and of the database may offer subscribers special promotional offers from time to time in exchange for a fee or in exchange for subscribing to the service.

Figure 10:
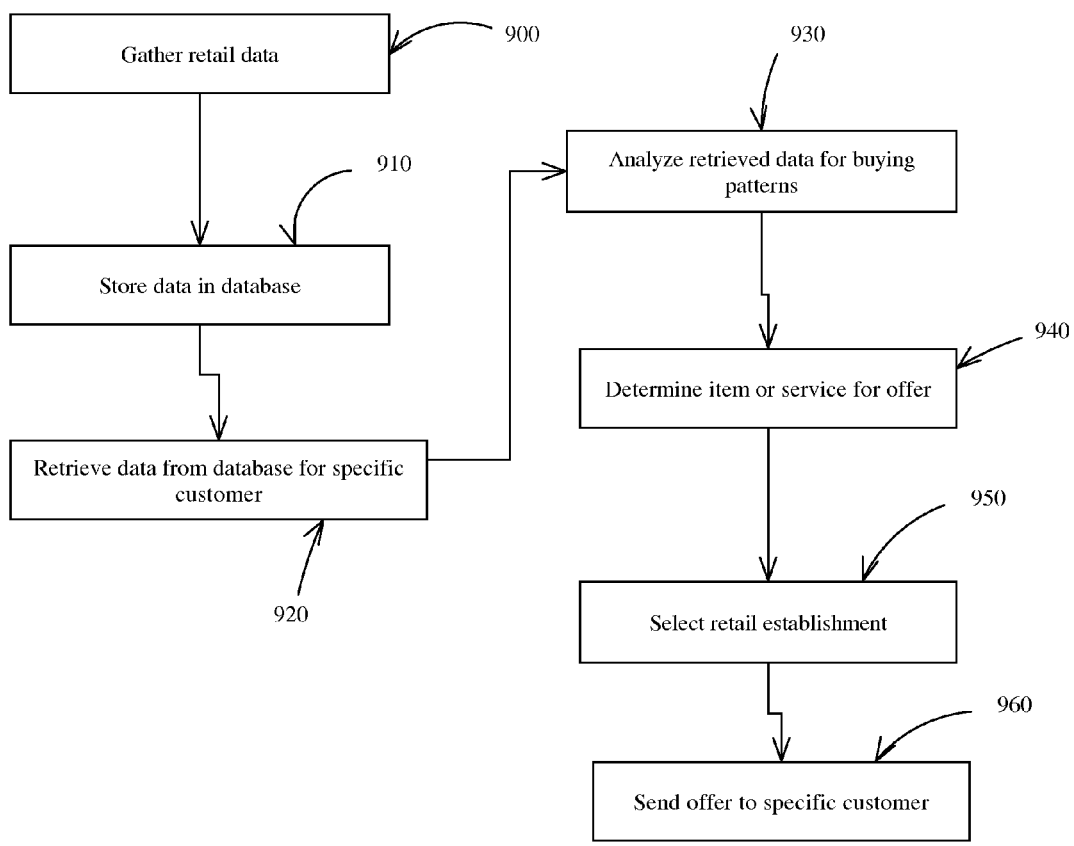
FIG. 10 shows a flowchart illustrating the steps for generating the offers.

Referring to FIG. 10, a flowchart illustrating the steps for generating the offers noted above is shown. The method for generating the special offers (which may or may not be promotional in nature) begins at step 900, that of gathering data from various different retailers about at least one purchase made by a specific customer. The data gathered from the multiple various retailers would include details regarding, among other details, the purchases such as the items or services purchased, the amounts for those purchases, the dates for the purchases, and whether payment was made by cash, credit, debit, or some other form of payment. Of course, the data gathering is not necessarily a single discrete step but may be executed over a long period of time. For example, as part of a datawarehousing agreement, the database storing the data for the specific customer may receive all transactional data (including customer purchasing, customer returns, etc., etc.) data from multiple retail establishments. By doing so, the database would thereby receive the data relating to multiple retail transactions made by the specific customer.

The next step, step 910, is that of storing the data received from the various retail establishments in the database.

Step 920 is that of sifting through the data in the database to retrieve purchased items data that relates to items or services previously purchased by the specific customer. This may be done automatically by querying the database for transactional details for retail transactions involving various identifiers such as (among others) the name of the specific customer, the credit card number(s) of the specific customer, or the specific customer's loyalty card use connected to the transaction. Also, if the specific customer used handheld device based loyalty programs, these may also be used to identify and retrieve retail transactions by the specific customer. Alternatively, if the operators of the database are, as noted above, operating a subscriber based server for special offers to customer subscribers, the purchase items data for specific customers may already be segregated if the specific customers are also subscribers to this service.

In step 930, once the purchase items data has been retrieved from the database, this purchase items data is then analyzed for the specific customer's buying patterns. Buying patterns such as what the specific customer likes to buy, the frequency of purchases of specific items, the time between purchases of specific items, the number of specific items of specific categories purchased, as well as the types of items purchased, may be determined in the analysis. As noted above in the discussion relating to FIG. 5, a transaction line by transaction line reading of the purchase item data will retrieve all of the details regarding what was purchased by the specific customer for each retail transaction. A similar approach may be used when determining a specific customer's purchasing patterns.

The analysis of the purchase item data may tally how much of each item the specific customer has purchased over a specific period of time. Alternatively, the tally may be done over the complete history of the specific customer with the database. By taking the complete history of the specific customer's purchases, the analysis takes into account any possible changes in the customer's purchasing behaviour. Any one of the above measures may be termed as a buying pattern for the specific customer. As an example, if the purchase item data from multiple retail establishments shows that the customer has purchased brand XYZ gum every 3 days from multiple retailers, then this means that the customer likes XYZ gum and that the customer does not have a specific supplier of XYZ gum. As another example, if the purchase item data shows that the customer has purchased a bottle of ABC wine from 3 different restaurants in 3 consecutive weeks, then the customer has a pattern of purchasing ABC wine. As yet another example, if the purchase item data shows that the customer has purchased 3 different brands of prosciutto ham from different retailers, this would mean that the customer likes prosciutto ham.

Once the analysis is complete, step 940 determines which item or service is to be offered to the specific customer. The selection of the item or service to be offered is based on one of the purchasing or buying patterns determined in step 930. As an example, for the customer who has purchased 3 different brands of prosciutto ham may have prosciutto ham as the item selected. It should be noted that other factors may be taken into account in addition to the buying patterns. As an example, the cost of the item to be selected may be taken into account (e.g. a price range may be predetermined for items or services to be selected—if an item is outside the price range, it cannot be selected). Another possible factor may be the availability of the item or service. As an example, if an item or service is not readily available among a wide cross section of retail establishments (perhaps retail establishments that use the server/database), then the item or service may not be selected.

Once the item or service is selected, step 950 is that of selecting a retail establishment through which the item or service may be purchased or the coupon for the item or service may be redeemed as part of a promotional event. The retail establishment selected may be from a pool of establishments that are slated to receive preferential treatment from the operators of the server or database. The preferential treatment may be as part of a membership agreement between the operators and various establishments that wish to promote their brand or their wares. Alternatively, the retail establishment may be selected from a pool of establishments that are running promotional offers. Ideally, the promotional offers are related to the item or service selected for the specific customer.

With the retail establishment selected and the item or service selected as well, the offer is now communicated to the specific customer (step 960). This may be done by way of email, text, smartphone applications, web browser-based technologies, or any other suitable communications means.

It should be noted that step 950 may be, in some implementations of the invention, unnecessary for the invention to work. The retail establishment need not be determined as coupons or promotional offers may take the form of a direct shipment of goods or services to the specific user (e.g. the shipment of a case of wine or a bottle of wine to a very good customer).

Figure 11:
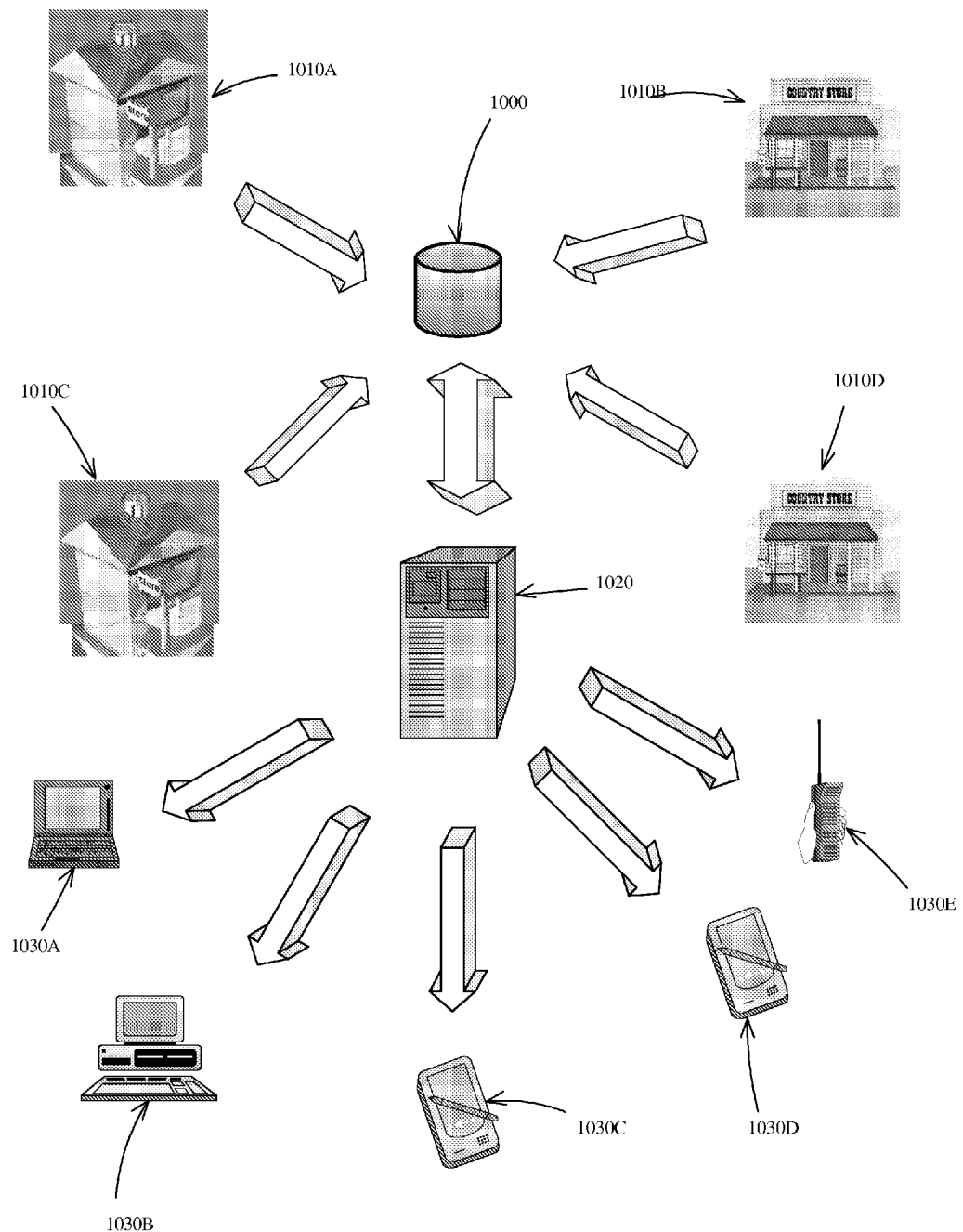
FIG. 11 illustrates a system on which the invention may be practiced.

Referring to FIG. 11, a system on which the invention may be practiced is illustrated. The system 1005 has a database 1000 into which retail transactions for retail establishments 1010A, 1010B, 1010C, 1010D are stored. A data processing system 1020 is in communication with the database 1000. The data processing system 1020 has the capability to process the retail transactions from the database and to derive data from them. The data processing system 1020 also has the capability to communicate with users 1030A, 1030B, 1030C, 1030D, 1030E.

The various retail establishments 1010A-1010D send their retail transactions to the database 1000 for storage. The retail establishments may also do this for data warehousing purposes, for clearinghouse purposes, or to process their retail transactions using the data processing subsystem (or server).

The database 1000 stores the data while the server 1020 can send out the survey along with the promotional offers or just offers to the various users. The users are, preferably, subscribers to the service offered by the operators of the database and/or the data processing system 1020.

As noted above, the determination of an offer to be made to a specific customer may be tied to the survey or customer feedback described and discussed above. Alternatively, the customized promotional offer may be on its own, i.e. not tied to a survey or customer feedback. The customized promotional offer may be offered by a retail establishment to a valued customer. As an example, a retail establishment may wish to offer a specific one of its valued customers a promotional offer. To determine a suitable promotional offer for this specific valued customer, the retail establishment may request that the operators of the server and database to recommend something that the retail establishment sells that would be of interest to the specific valued customer. By executing the above discussed method, the server can, by analyzing the specific valued customer's history of purchases (and not just from the retail establishment with the promotional offer), determine what item or service would be suitable for the valued customer. Of course, the item or service selected would have to be available from the retail establishment making the promotion.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language For example, preferred embodiments may be implemented in a procedural programming language (e.g."C") or an object oriented language (e.g."C++", "java", or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

Having thus described the invention, what is claimed as new and secured by Letters Patent is:

1. A computer implemented method executed on data processing system for generating specific and targeted offers for a specific subscriber, the method comprising:
   a) receiving, by a processor, data for storage at a server, said data being received from a first group of different retail establishments, said data being sent by said first group of retail establishments as part of a previously established datawarehousing agreement for storing and managing retail data between said first group of retail establishments and an operator of said server, said data being retail data generated by each one of said first group of retail establishments, said retail data including customer names, customer credit cards, customer credit cards, customer loyalty cards, items purchased by a customer, and prices for said items;
   b) storing, by said processor, said data in a database at said server;
   c) determining, by said processor, which retail data received in step a) comprises subscribers data, said subscribers are customers subscribing an Internet-based paid service operated by said operator for providing specialized promotional offers to subscribers;
   d) segregating in said database, by said processor, said retail data relating to said subscribers determined in step c);
   e) receiving, by said processor, a request for a specific and targeted offer for a specific subscriber, said specific subscriber being a subscriber to said Internet-based paid service;
   f) determining, by said processor, that purchased items data for said specific subscriber is part of data segregated in step d) and, once determined, retrieving, by said processor, said purchased items data for said specific subscriber from said database, said purchased items data relating to items or services previously purchased by said specific subscriber from members of said first group of different retail establishments;
   g) determining, by said processor, at least one buying pattern of said specific subscriber based on said purchased items data;
   h) based on at least one of said at least one buying pattern, determining by said processor, at least one item or service to be offered to said specific subscriber;
   i) determining, by said processor, from a second group of retail establishments, which retail establishments offers said at least one item or service to be offered to said specific subscriber, said second group of retail establishments being a group of retail establishments which have a previously established membership agreement with said operator to receive preferential treatment from said operator when said operator selects suppliers for said specific and targeted offers;
   j) selecting, by said processor, from retail establishments determined in step i) which at least one retail establishment is to be used for offering said at least one item or service to said specific subscriber, said at least on retail establishment to be selected offering said at least one item or service determined in step h);
   k) communicating, by said processor, with said specific subscriber, to offer said at least one item or service from said at least one retail establishment selected in step j).

2. A method according to claim 1 where in step e) further comprises determining types of items bought by said specific subscriber.

3. A method according to claim 1 wherein step e) further comprises determining types of items bought by said specific subscriber over a predetermined period of time.

4. A method according to claim 1 wherein step e) comprises determining a frequency of purchases of specific items or services made by said specific subscriber.

5. A method according to claim 4 wherein step e) further comprises determining a frequency of purchases of specific items or services made by said specific subscriber over a predetermined period of time.

6. A method according to claim 1 wherein step e) further comprises determining how many of a specific item has been bought by said specific subscriber.

7. A method according to claim 6 wherein step d) comprises determining how many of a specific item has been bought by said specific subscriber over a predetermined period of time.

8. A method according to claim 1 wherein said data received from said first group of different retail establishments are gathered from point of sale terminals at said different retail establishments of said first group.

9. A method according to claim 1 wherein, for step g), said at least one retail establishment selected from said second group is a retail establishment which is running at least one promotional offer.

10. A method according to claim 1 wherein, for step f), said at least one item or service to be offered to said specific subscriber is within a predetermined price range.

11. A method according to claim 10 wherein, for step f), said predetermined price range is based on prices of items or services previously purchased by said specific subscriber.

12. A method according to claim 1 further including the step of offering to said specific subscriber for immediate purchase said at least one item or service determined in step f) from said at least one retail establishment selected in step g).

13. Non-transitory computer-readable media having encoded thereon non-transitory computer-readable instructions which, when executed, implements a computer-implemented method for generating specific and targeted offers for a specific user, the method comprising:
   a) receiving, by a processor, data for storage at a server, said data being received from a first group of different retail establishments, said data being sent by said first group of retail establishments as part of a previously established datawarehousing agreement for storing and managing retail data between said first group of retail establishments and an operator of said server, said data being retail data generated by each one of said first group of retail establishments, said retail data including customer names, customer credit cards, customer credit cards, customer loyalty cards, items purchased by a customer, and prices for said items;
   b) storing, by said processor, said data in a database at said server;
   c) determining, by said processor, which retail data received in step a) comprises subscribers data, said subscribers are customers subscribing an Internet-based paid service operated by said operator for providing specialized promotional offers to subscribers;
   d) segregating in said database, by said processor, said retail data relating to said subscribers determined in step c);
   e) receiving, by said processor, a request for a specific and targeted offer for a specific subscriber, said specific subscriber being a subscriber to said Internet-based paid service;
   f) determining, by said processor, that purchased items data for said specific subscriber is part of data segregated in step d) and, once determined, retrieving, by said processor, said purchased items data for said specific subscriber from said database, said purchased items data relating to items or services previously purchased by said specific subscriber from members of said first group of different retail establishments;
   g) determining, by said processor, at least one buying pattern of said specific subscriber based on said purchased items data;
   h) based on at least one of said at least one buying pattern, determining by said processor, at least one item or service to be offered to said specific subscriber;
   i) determining, by said processor, from a second group of retail establishments, which retail establishments offers said at least one item or service to be offered to said specific subscriber, said second group of retail establishments being a group of retail establishments which have a previously established membership agreement with said operator to receive preferential treatment from said operator when said operator selects suppliers for said specific and targeted offers;
   j) selecting, by said processor, from retail establishments determined in step i) which at least one retail establishment is to be used for offering said at least one item or service to said specific subscriber, said at least on retail establishment to be selected offering said at least one item or service determined in step h);
   k) communicating, by said processor, with said specific subscriber, to offer said at least one item or service from said at least one retail establishment selected in step j).

* * * * *